United States Patent [19]
Khan

[11] Patent Number: 5,345,892
[45] Date of Patent: Sep. 13, 1994

[54] AUTOMATIC PET FEEDER

[76] Inventor: Osman M. Khan, 16314 E. Vaughn, Gilbert, Ariz. 85234

[21] Appl. No.: 204,945

[22] Filed: Mar. 2, 1994

[51] Int. Cl.$^5$ ............................................. A01K 39/04
[52] U.S. Cl. ................................. 119/51.5; 119/521; 119/53; 119/57.9
[58] Field of Search ............... 119/51.5, 51.01, 53, 119/57.8, 52.1, 52.2, 57.9

[56] References Cited

U.S. PATENT DOCUMENTS

| | | | |
|---|---|---|---|
| 1,822,289 | 9/1931 | Helmers | 119/53 |
| 4,007,711 | 2/1977 | Michael | 119/51.5 |
| 4,327,669 | 5/1982 | Blasbala | 119/57.8 |
| 4,498,423 | 2/1985 | Gainsboro | 119/57.8 |
| 4,699,089 | 10/1987 | Traschke | 119/51.5 |
| 4,896,628 | 1/1990 | Kaduncia | 119/52.1 |
| 5,033,411 | 7/1991 | Brucker | 119/52.2 |
| 5,105,765 | 4/1992 | Loken | 119/57.9 |
| 5,195,460 | 3/1993 | Loken | 119/57.8 |
| 5,230,301 | 7/1993 | Nass | 119/52.1 |
| 5,235,935 | 8/1993 | Edwards | 119/57.8 |

FOREIGN PATENT DOCUMENTS 1052064  1/1954  France ..................... 119/51.5

*Primary Examiner*—Paul J. Hirsch
*Attorney, Agent, or Firm*—John D. Lister

[57] ABSTRACT

An automatic pet feeder comprises a vertically extending tubular food reservoir, a tubular food loading port adjacent an upper end of the tubular food reservoir and at least one tubular feeding port adjacent a lower end of the tubular food reservoir. The tubular food reservoir is closed at its upper and lower ends and is provided with a means at its upper end for either non-rotatably or rotatably suspending the automatic pet feeder above the ground. The food loading port has a removable cap for sealing the loading port when food is not being loaded into the pet feeder. Each feeding port is sealed by a pivotally mounted cover plate which can be pivoted out of the way by a pet to gain access to food in the feeding port. The pet feeder can also have a support stand which has a collar that slidably receives the lower end of the tubular food reservoir to support the pet feeder on the ground or floor.

13 Claims, 2 Drawing Sheets

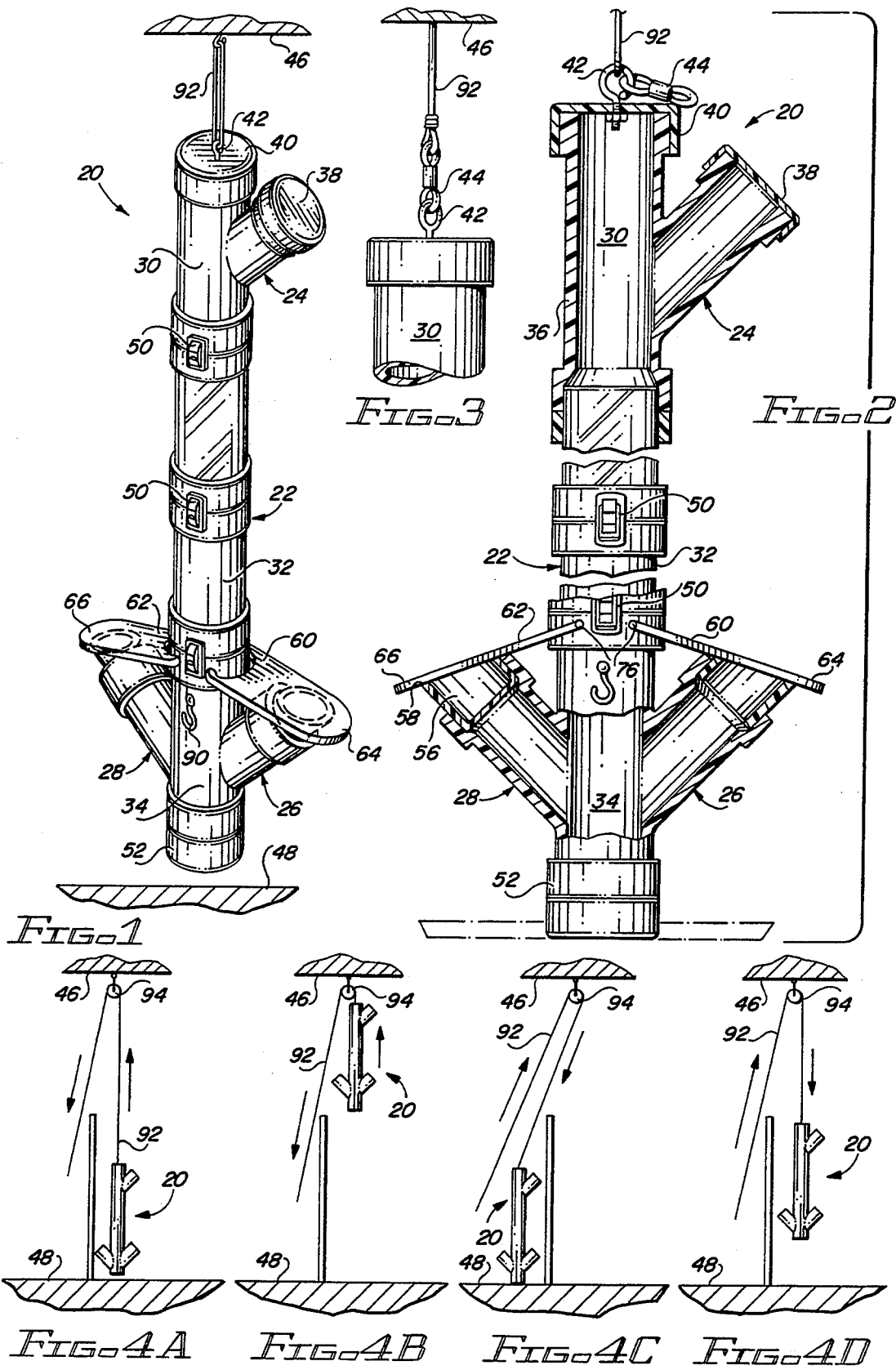

AUTOMATIC PET FEEDER

BACKGROUND OF THE INVENTION

The present invention is directed to a pet feeder and in particular, to an indoor or outdoor automatic pet feeder for dogs, cats and the like that is reliable, convenient to use, hygienic, economical and easy to assemble or disassemble for cleaning, storage, packaging and/or transport.

The automatic pet feeder of the present invention is designed to dispense the dry, pelletized pet food that is commonly available to pet owners at pet and grocery stores throughout the country. With its food reservoir, enough food can be stored within the automatic pet feeder for several days, a week or longer. Of course, if a pet owner were going to be absent for more than a day, a neighbor, friend or relative should be asked to periodically check on the pet to be sure that the pet's food supply and other needs are being met. Accordingly, the automatic pet feeder provides a reliable, convenient means to assure that a pet will have food during temporary absences by a pet owner.

Since the automatic pet feeder of the present invention is sealed, the automatic pet feeder is hygienic and protects the pelletized pet food from contamination and/or moisture due to rain, snow, mice, birds, ants, other insects and dust. This enables pet food to be held within the automatic pet feeder for extended periods of time without fear that the pet food will become unsuitable for consumption by a pet.

At least a portion of and, preferably, the entire food reservoir and feeding port(s) of the automatic pet feeder of the present invention are transparent so that the level and remaining quantity of food in the automatic pet feeder and the availability of food in the feeding port(s) can be easily determined, even at a distance, by directly viewing the amount of pet food remaining in the food reservoir and the pet feeding port(s). Thus, when a pet is housed in a pen, the amount of food available to the pet can be determined from outside the pen. This adds to the convenience of using the automatic pet feeder, which is especially important when a neighbor, friend or relative has been asked to look after the pet(s).

The automatic pet feeder of the present invention is designed to be suspended within a pen and can be readily removed from a pen to be replenished with food without the need for anyone to enter the pen. This feature, in combination with the use of a transparent food reservoir, makes the automatic pet feeder easy and convenient to use, especially, when the pet owner is concerned that someone entering the pen might accidently release the pet from the pen; when the pet is not accustomed to being handled by strangers; or the pet is a guard dog or otherwise unfriendly to strangers.

By suspending the automatic pet feeder, the height of the automatic pet feeder above the ground or floor can be adjusted to accommodate the size of the pet feeding from the automatic pet feeder. For larger pets, the automatic pet feeder can be raised. For smaller pets, the automatic pet feeder can be lowered. In addition, when a more controlled feeding of the pet is desired, the pet owner can easily raise the automatic pet feeder to a height where the automatic pet feeder is not available to the pet. This can be performed manually or through the use of a timer and an automatic winch.

The automatic pet feeder of the present invention is designed to be either non-rotatably or rotatably suspended off the ground or floor. When suspended in the non-rotatable mode, the automatic pet feeder is in a relatively stable, stationary position. When suspended in the rotatable mode, the pet must move with a feeding port of the automatic pet feeder as the feeding port rotates and moves during feeding. This gives the pet a chance to play while it is feeding and it can also discourage overeating by certain pets as the pet will have to move with the pet feeder as the automatic pet feeder rotates.

In addition to being designed to be suspended from a ceiling, joist, beam, tree limb, door frame, or some other horizontally extending member located some distance off the ground or floor, the automatic pet feeder of the present invention can also be mounted in a support stand. The automatic pet feeder does not rotate in the support stand, but the ability of the automatic pet feeder to be held in a support stand increases the versatility of the pet feeder and enables the pet feeder to be used in locations where the pet feeder can not be suspended.

The automatic pet feeder of the present invention can be made from plastic pipe, as well as other materials, and accordingly, the automatic pet feeder is inexpensive, durable and easy to clean. The automatic pet feeder has very few moving parts which minimizes any chance that the pet feeder might malfunction. In addition, the automatic pet feeder can be easily disassembled and reassembled without the use of any tools. Thus, the automatic pet feeder is easy to clean, store, package and transport.

SUMMARY OF THE INVENTION

The automatic pet feeder of the present invention comprises a vertically extending tubular food reservoir; a tubular food loading port adjacent an upper end of the tubular food reservoir for loading or replenishing the tubular reservoir with pelletized pet food; and at least one tubular feeding port adjacent a lower end of the tubular food reservoir where the pet can gain access to the pet food and feed.

The tubular food reservoir is closed at its upper end and its lower end and is provided with a hook and/or swivel at its upper end for non-rotatably or rotatably suspending the automatic pet feeder above the ground or floor. The food loading port has a removable cap or other closure means for sealing the food loading port when food is not being introduced into the tubular food reservoir through the food loading port.

Each feeding port of the automatic pet feeder is sealed by a pivotally mounted cover plate which can be pivoted out of the way by a pet to gain access to pet food in the feeding port. As the pet eats food from a feeding port, the food is automatically replaced in the feeding port by pet food from the tubular food reservoir which flows down into the feeding port to keep the feeding port full of pet food.

The automatic pet feeder can also be held in a support stand which has a collar that slidably receives the lower end of the tubular food reservoir to support the automatic pet feeder on the ground or a floor. In one embodiment, the automatic pet feeder is made of transparent or translucent plastic pipe for durability, ease of construction and low cost.

The tubular food reservoir of the automatic pet feeder can be made in three or more separable sections, e.g. pipe sections which are secured together by quick release latches. Thus, the capacity of the tubular food reservoir can be quickly changed to accommodate more or less food and the automatic pet feeder can be quickly and easily disassembled and reassembled for storage, cleaning, etc.

BRIEF DESCRIPTION OF THE DRAWINGS

FIG. 1 is a perspective view of the automatic pet feeder of the present invention suspended above the ground or a floor.

FIG. 2 is a side view of the automatic pet feeder of the present invention with portions broken away for illustrative purposes and illustrating the use of a supplemental feeding cup.

FIG. 3 is a partial side view of an upper portion of the automatic pet feeder using a swivel suspension.

FIGS. 4A, 4B, 4C, and 4D schematically show the automatic pet feeder being removed from and reintroduced into a pet pen.

DESCRIPTION OF THE PREFERRED EMBODIMENTS

Figure 5:
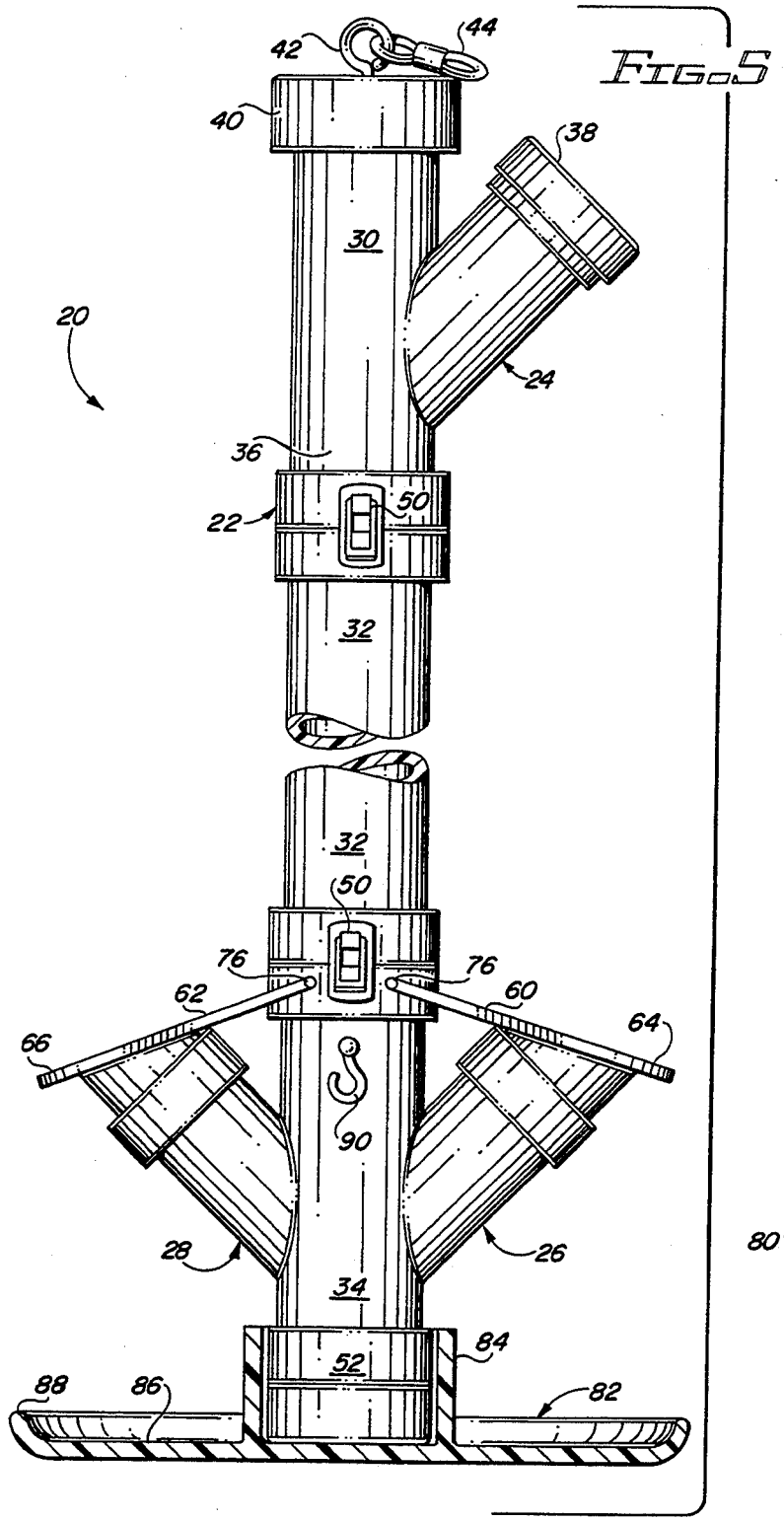
FIG. 5 is a side view, with portions broken away, of the automatic pet feeder held in a support stand.

FIGS. 1 and 2 show the automatic pet feeder 20 of the present invention which comprises a tubular food reservoir 22; a tubular food loading port 24 adjacent an upper end of the tubular food reservoir and a pair of tubular feeding ports 26 and 28 adjacent a lower end of the tubular food reservoir. The automatic pet feeder 20 typically comprises three sections: an upper section 30 which includes an upper portion of the tubular food reservoir 22 and the tubular food loading port 24; an intermediate section 32 which comprises a major portion of the tubular food reservoir 22; and a lower section 34 which includes a lower portion of the food reservoir 22 and one or two feeding ports 26 and 28.

As shown, the automatic pet feeder 20 is primarily made of commercially available transparent plastic pipe components. However, it is contemplated that the automatic pet feeder can be made from transparent or translucent tubular pieces of plastic, fiber glass, plexiglass, or similar materials specifically molded for the pet feeder. As used herein a translucent material is one that would be clear enough to view whether or not food is within the automatic pet feeder. While the diameter of the pipe components used to construct the automatic pet feeder 20 can vary, one embodiment uses pipe components having an inside diameter of about four inches and a length or height of about forty inches. An automatic pet feeder of these dimensions will hold enough dry pelletized food to feed an average size dog for from ten to fifteen days. The internal diameter of the pipe components is selected to achieve a smooth unimpeded flow of the pelletized pet food through the automatic pet feeder 20 from the food loading port 24 through the food reservoir 22 and into the feeding port or ports 26 and 28 where the pet can gain access to the pelletized food. Larger diameter components are used for pet feeders intended to feed larger pets.

As best shown in FIGS. 1 and 2, the upper section 30 of the automatic pet feeder 20 comprises a vertical tubular portion 36 which forms the upper part of the tubular food reservoir 22 and the tubular food loading port 24.

The tubular food loading port extends upwardly from the tubular portion 36 at an angle of about 45° to 60° to the longitudinal vertical centerline of the tubular portion 36.

The free end of the tubular food loading port 24 is provided with a removable closure 38 for sealing the opening of the port 24 when food is not being introduced into the automatic pet feeder through the food loading port. As shown, the closure 38 is a plastic cap that fits tightly over the free end of the food loading port. However, it is contemplated that the cap can be threaded onto the free end of the food loading port 24 if desired.

The uppermost end of the upper section 30 of the automatic pet feeder is sealed by an end cap 40. As shown, the end cap is plastic and is adhesively bonded to the uppermost end of section 30. The end cap can also be threaded onto the uppermost end of the section 30. The end cap 40 must be secured to the upper section 30 so that the end cap will support the entire weight of the automatic pet feeder when loaded with food. As shown in FIGS. 1, 2 and 3, the end cap 40 is provided with a metallic hook 42 and a swivel 44 for suspending the automatic pet feeder from an overhead support 46 and off the ground or floor 48 as will be described hereinafter.

The intermediate section 32 of the automatic pet feeder is a tubular section which comprises a major portion of the tubular food reservoir 22. The intermediate section 32 is transparent to enable the level of the pelletized pet food within the reservoir to be determined from a distance by directly viewing the food remaining in the reservoir 22. While the intermediate section 32 is shown comprising only one length of pipe, if desired the intermediate section can comprise more than one pipe section for greater storage capacity or in the alternative the length of the single pipe section used can be selected to be longer or shorter to vary the storage capacity of the food reservoir. As shown, the intermediate section 32 is releasably secured to the upper section 30 and the lower section 34 by quick release latches 50. This enables the automatic pet feeder 20 to be easily and quickly disassembled and reassembled for cleaning, storage, etc. without the use of any tools.

Figure 6:
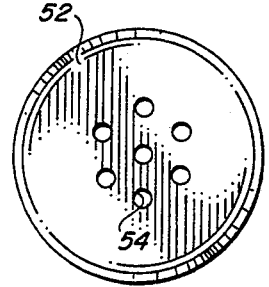
FIG. 6 is a view from below of the lower end of the automatic pet feeder to show the drainage holes in the lower end of the tubular food reservoir.

The lower section 34 of the automatic pet feeder is sealed at its bottom end by an end cap 52 which is adhesively bonded to, threaded onto or otherwise affixed to the bottom end of the lower section 34. The end cap 52 is provided with two to six very small drainage holes 54, illustrated in FIG. 6, which enable any moisture that might condense within the tubular food reservoir 22 or otherwise enter the automatic pet feeder 20 to drain from the feeder. The holes also facilitate drainage of water from the automatic pet feeder when the pet feeder is being washed.

The automatic pet feeder 20 shown in FIGS. 1 and 2 has two tubular feeding ports 26 and 28. Although two tubular feeding ports are illustrated in FIGS. 1 and 2, the automatic pet feeder 20 can be made with only one feeding port 26. The second feeding port is provided to accommodate a cup 56 which can be used for supplemental food like milk, semisolid food, vitamin tablets or even a different type of solid dry food which the owner wishes to test for pet acceptance before buying large quantities of the food. The cup 56 is preferably made of plastic and slides into and out of the second tubular feeding port 26 where it is kept from sliding to far into the feeding port by a lip within the feeding port.

The tubular feeding ports 26 and 28 each project upwardly from the lower end of the tubular food reservoir 22 at an angle of about 45° to about 60° to the longitudinal vertical axis of the tubular food reservoir. For an automatic pet feeder about forty inches high and made with four inch inside diameter pipe components, the feeding ports 26 and 28 are typically about five inches above the lower end of the automatic pet feeder. The free ends of the tubular feeding ports 26 and 28 are normally sealed by transparent, plastic cover plates 60 and 62 which are pivotally mounted on the tubular food reservoir 22. The cover plates 60 and 62 each extend outwardly from the tubular food reservoir 22 at an angle below the horizontal of about 25° and lie flush upon the open free ends of the tubular feeding ports or the open end 58 of the supplemental food cup 56 to seal the open free ends of the feeding ports and/or supplemental food cup when a pet is not feeding from the feeding port or cup. As shown in FIGS. 1 and 2, free ends 64 and 66 of the cover plates extend beyond the open free ends of the feeding ports 26 and 28 so that a pet can pivot the cover plate up and out of the way with its muzzle to gain access to the food within the feeding port.

Figure 7A:
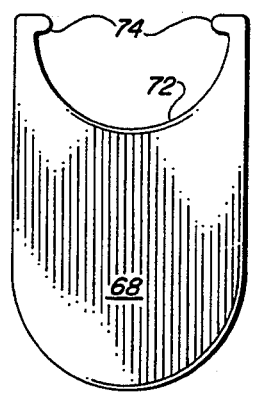
FIGS. 7A and 7B show two different embodiments of the cover plate for the feeding port(s).
Figure 7B:
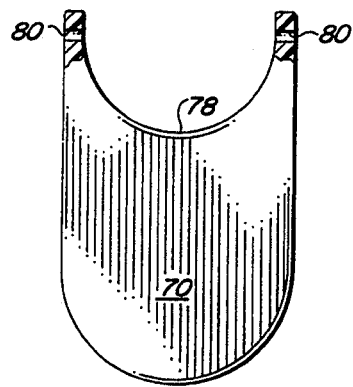

FIGS. 7A and 7B show two different types of cover plates 68 and 70 which can be used as cover plates 60 and 62 to seal the free open ends of the feeding ports 26 and 28. Both of the cover plates are preferably transparent so that a pet can view the food within the feeding port and made of plastic. The cover plate 68 of FIG. 7A has an integral yoke portion 72 which fits over the outer surface of the tubular food reservoir 22. The free ends of the yoke legs are provided with inwardly directed projections 74 which snap fit into holes 76 provided in the tubular food reservoir to pivotally mount the cover plate on the tubular food reservoir. The cover plate 70 of FIG. 7B has an integral yoke portion 78 which fits over the outer surface of the tubular food reservoir 22. The free ends of the yoke legs are provided with holes through which bolts or other fastening means can be threaded into the holes 76 to pivotally mount the cover plate on the tubular food reservoir.

FIG. 5 shows the automatic pet feeder 20 of the present invention supported in a support stand 82. The support stand comprises an upstanding collar portion 84 and a base plate 86. The lower end cap 52 of the automatic pet feeder is slidably received within the collar portion 84 which has an internal diameter substantially the same as but slightly greater than the outside diameter of the lower end cap. The base plate is preferably circular and provided with a peripheral lip 88 to keep any food dropped by a pet off the ground or floor. The base plate 86 can also have a rectangular or other suitable configuration if desired. The support stand provides an alternative means for supporting the automatic pet feeder 20 when a suitable overhead support is not available or the pet owner merely chooses to support the pet feeder on the ground or floor. The diameter of the base plate 86 is selected to provide the necessary stability to the automatic pet feeder. For an automatic pet feeder about forty inches high, the base plate 86 is typically twenty-four inches in diameter and the collar portion 84 is about five inches high.

A hook 90 can also be provided on the tubular food reservoir 22 for attaching a bell to the automatic pet feeder which will ring when a pet is feeding from the pet feeder 20. As shown the hook 90 is mounted on the lower section 30 of the automatic pet feeder. If desired, the hook 90 can also be mounted on the intermediate section or the upper section of the automatic pet feeder.

FIGS. 4A-4D show the automatic pet feeder 20 being removed from and then reintroduced into a pet pen. The pet feeder is suspended by a rope or wire rope 92 (e.g. a 3/16 inch steel wire rope) from an overhead support 46 by means of a pulley 94. As shown in FIG. 4A, the automatic pet feeder is within the pen. In FIGS. 4B and 4C, the automatic pet feeder 20 is being raised over a fence of the pen and swung outside of the pen where it can be refilled with pelletized pet food. In FIG. 4D, the automatic pet feeder has been returned inside of the pen where it will be suspended above the ground 48 at the proper level to give a pet access to the food port or ports. The automatic pet feeder is shown in FIG. 4A at a lower level for feeding smaller pets and in FIG. 4D at a higher level for feeding larger pets. More than one automatic pet feeder can be used to accommodate pets of several different sizes in a pen or to provide a second source of food. When the automatic pet feeder is located at the desired height above the ground or floor 48, the wire or rope 92 is secured to hold the automatic pet feeder in that position.

FIGS. 1, 2 and 3 show two different ways of suspending the automatic pet feeder above the floor or ground 48. In FIGS. 1 and 2, the wire or rope 92 passes through the hook 42 in the upper end of the automatic pet feeder. When suspended above the ground or floor 48 in this manner, the automatic pet feeder 20 does not rotate to any extent when a pet is feeding from one of the feeding ports 26 or 28. In FIG. 3, the rope or wire 92 passes through a swivel 44 mounted on the hook 42 to facilitate the rotation of the automatic pet feeder. This adds interest to the feeding for the pet and discourages overeating by some pets. By keeping the lower end of the pet feeder off of the ground or floor 48, the automatic pet feeder can not only be suspended to rotate when a pet is feeding, but insects, mice, etc., are kept from the gaining access to the automatic pet feeder.

When pelletized pet food is added to the automatic pet feeder 20 through the tubular food loading port 24, the pelletized food flows down through the tubular food reservoir 22 and up into the tubular feeding ports 26 and 28 where a pet can gain access to the pelletized food. The pet gains access to the pelletized food by pivoting and raising the cover plate with its muzzle and inserting its muzzle partially into the open end of the tubular feeding port. Pets quickly learn how to gain access to the food by raising the cover plates 62 and 64. As the pet consumes the pelletized food from the feeding port, more pelletized flows down into the feeding port from the food reservoir to replace the food consumed. When the pet is finished eating, the cover plate automatically pivots back into place to seal the otherwise open end of the feeding port.

In describing the invention certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An automatic pet feeder comprising:
   a vertically extending tubular food reservoir; said vertically extending tubular food reservoir having a longitudinal centerline; said tubular food reservoir being closed at an upper end and closed at a lower end;

said tubular food reservoir having a tubular food loading port, adjacent said upper end, extending upwardly at an acute angle to said longitudinal centerline of said vertically extending tubular food reservoir; said tubular food loading port having a removable cap for sealing said food loading port when the food loading port is not in use; and said tubular food reservoir having a tubular feeding port, adjacent said lower end, extending upwardly at an acute angle to said longitudinal centerline of said vertically extending tubular food reservoir; and said tubular feeding port having a cover plate for sealing an otherwise open end of said feeding port; and said cover plate being pivotally mounted on said tubular food reservoir so that a pet can pivot said cover plate out of the way to gain access to food in said feeding port of the pet feeder.

2. The automatic pet feeder of claim 1, wherein: said upper end of said vertically extending tubular food reservoir has a suspension means for suspending the pet feeder above the ground.

3. The automatic pet feeder of claim 1, wherein: said upper end of said vertically extending tubular food reservoir has a suspension means for rotatably suspending the pet feeder above the ground.

4. The automatic pet feeder of claim 3, wherein: said suspension means includes a swivel for facilitating rotation of the pet feeder.

5. The automatic pet feeder of claim 1, wherein: said tubular food reservoir has a second tubular feeding port, adjacent said lower end, extending upwardly at an acute angle to said longitudinal centerline of said vertically extending tubular food reservoir; said second tubular feeding port has a cover plate for sealing an otherwise open end of said feeding port; and said cover plate being pivotally mounted on said tubular food reservoir so that a pet can pivot said cover plate out of the way to gain access to food in said second feeding port.

6. The automatic pet feeder of claim 5, wherein: said second tubular feeding port has a cup therein for holding a liquid.

7. The automatic pet feeder of claim 1, wherein: said lower end of said vertically extending tubular food reservoir has small apertures therein to permit liquids to drain from said tubular food reservoir to keep food within said tubular food reservoir dry.

8. The automatic pet feeder of claim 1, wherein: said vertically extending tubular food reservoir comprises an upper section which includes said tubular food loading port, a lower section which includes said tubular feeding port, and an intermediate section separably secured to said upper section and said lower section whereby said intermediate section can be removed from said vertically extending tubular food reservoir to change the storage capacity of said tubular food reservoir.

9. The automatic pet feeder of claim 8, wherein: said sections are secured together by quick release latches.

10. The automatic pet feeder of claim 1, wherein: said lower end of said vertically extending tubular food reservoir is slidably received within a tubular retaining collar of a support stand to retain the pet feeder in a vertical position.

11. The automatic pet feeder of claim 10, wherein: said support stand comprises a circular base plate with a peripheral lip to keep food spilled by a pet from the ground and said retaining collar is centrally located on said base plate.

12. The automatic pet feeder of claim 1, wherein: at least a portion of a wall of said vertically extending tubular food reservoir is transparent so that the amount of food within the pet feeder can be determined by looking through said portion of said wall.

13. The automatic pet feeder of claim 1, wherein: said vertically extending tubular food reservoir, said tubular food loading port and said tubular feeding port are made of plastic pipe.

* * * * *